United States Patent Office 3,187,928
Patented June 8, 1965

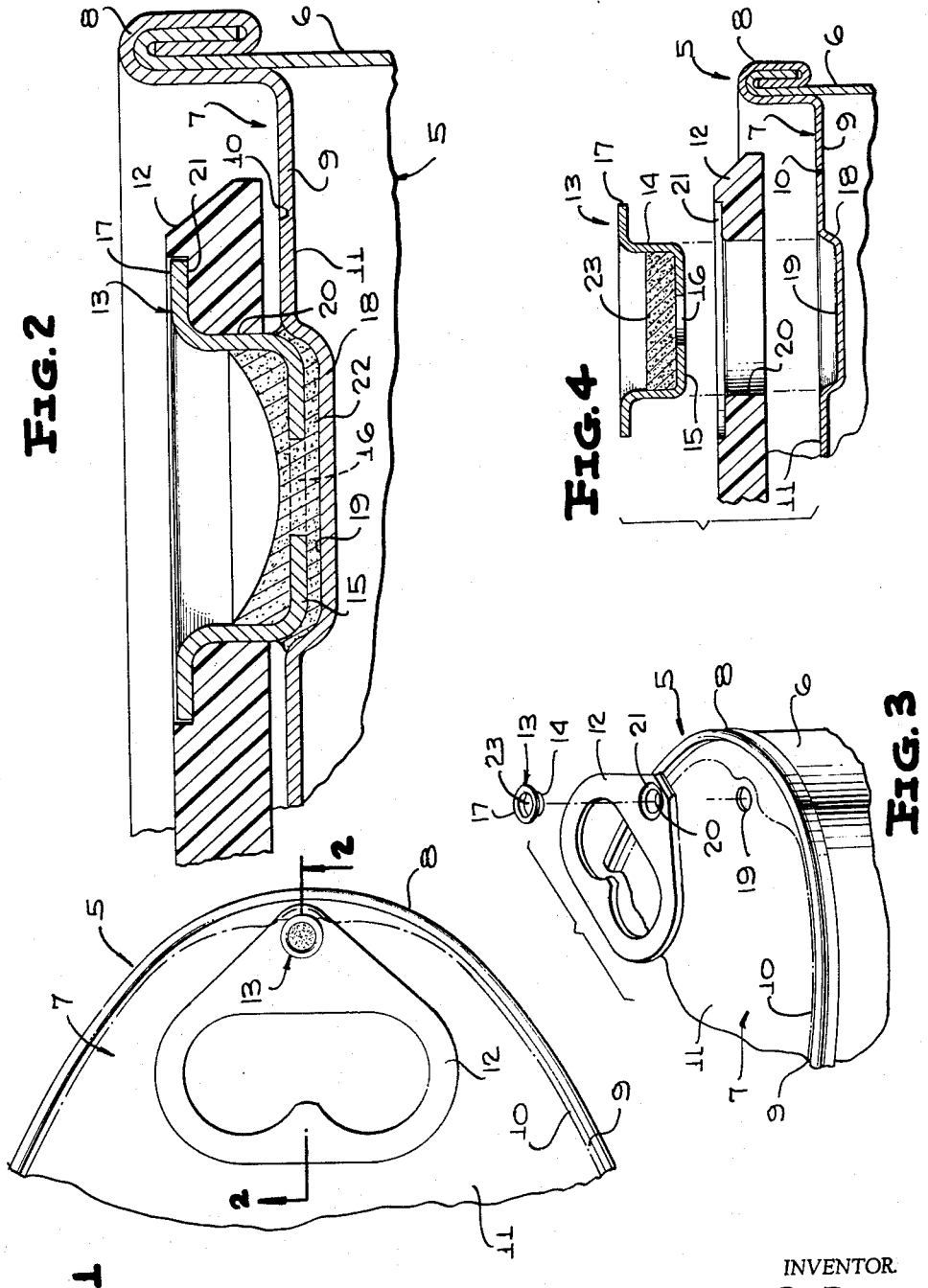

3,187,928
PLASTIC PULL HANDLE PIVOTALLY SECURED TO SCORED METAL CAN END
John S. Bozek, Chicago, Ill., assignor to Continental Can Company, Inc., New York, N.Y., a corporation of New York
Filed Oct. 8, 1962, Ser. No. 228,900
11 Claims. (Cl. 220—54)

This invention relates in general to new and useful improvements in the manufacture of containers, and more particularly relates to a novel manner of pivotally connecting a pull handle to a removable portion of a can end.

In order to facilitate the opening of containers, such as cans, the ends of such containers are being provided with weakening lines defining removable portions of the ends. In order to facilitate the removal of these removable portions without the use of special tools, pull tabs or handles are secured to the removable portions. In certain of these pull handle arrangements, it is desirable that the pull handle be pivotally connected to the associated portion of the end in order that the necessary pull may be exerted. It is to this type of container construction that the present specifically relates.

Numerous ways have been attempted to secure pull handles to removable portions of can ends in a manner which permits pivoting of the pull handles. In view of the fact that it is desirable to not form any opening in the can end which could possibly result in leakage, and since it is undesirable to form a rivet integral with the can end, it has been found advantageous to utilize a pivot member. This pivot member is most advantageously secured to the removable portion of the can end by soldering. However, it is difficult and expensive to form the solder connection in accordance with the present methods.

It is therefore the primary object of this invention to provide a novel method of soldering a pivot member for a pull handle which is attached to a removable portion of a can end wherein the pivot member is of a hollow construction and is provided with a solder pellet, the pivot member further having an end wall which is to be secured to the removable portion of the can end and the end wall having an opening therethrough wherein after the pull handle, the pivot member and the can end have been assembled, it is merely necessary to heat the solder pellet with the result that the solder will flow through the opening in the end wall of the pivot member and between the end wall and the can end to solder the two together.

Another object of this invention is to provide a novel pivot member which is adapted to be soldered to a base member for pivotally mounting an article thereon, the pivot member including a tubular shaft having an end wall at one end and a retaining flange at the opposite end, the end wall having an opening therethrough, and a solder pellet disposed within the tubular shaft and adapted to be heated for flowing through the opening in the end wall.

A further object of this invention is to provide a novel can end construction wherein the can end has a removable portion defined by a weakening line, and a pull handle pivotally connected to the removable portion of the can end to facilitate the tearing out of the removable portion, the pull handle being secured to the removable portion of the can end by means of a pivot member which is of a hollow construction and has an end wall soldering to the removable portion of the can end, the end wall having a solder passage therethrough, and there being solder within the pivot member and the solder passing through the opening in the end wall and being disposed between the end wall and the removable portion of the can end.

With the above, and other objects in view that will hereinafter appear, the nature of the invention will be more clearly understood by reference to the following detailed description, the appended claims and the several views illustrated in the accompanying drawing:

FIGURE 1 is a fragmentary plan view of a can formed in accordance with this invention and shows generally the relationship of the pull handle of the can and the removable portion of the can end;

FIGURE 2 is an enlarged fragmentary vertical sectional view taken on the line 2—2 of FIGURE 1 and shows the specific construction of the pivotal connection between the pull handle and the removable portion of the can end;

FIGURE 3 is a fragmentary exploded perspective view showing the general relationship of the pull handle and the pivot member prior to the securement of the pull handle to the can end;

FIGURE 4 is an enlarged fragmentary vertical sectional view showing the can end, the pull handle and the pivot member immediately prior to the assembling of these components.

Referring now to the drawings in detail, it will be seen that there is illustrated a can which is generally referred to by the numeral 5. The can 5 is a ham can although the invention is not so limited. For descriptive purposes, the ham can 5 includes a can body 6 and an end wall 7. The end wall 7 is secured to the can body 6 in a conventional manner by means of a conventional double seam 8.

The can end 7 includes an end panel 9 of which a major portion is removable and defined by a weakening line 10. The removable portion of the end panel is referred to by the numeral 11.

In order to facilitate the removal of the removable portion 11 and to thereby gain access to the contents of the can 5, there is secured to the removable portion 11 a pull handle 12. The pull handle 12 illustrated in the drawing is formed of a plastic material and is secured to the removable portion 11 for pivotal movement by means of a pivot member generally referred to by the numeral 13.

At this time it is pointed out that the specific configuration of the pull handle 12 may be varied and it is not necessary that the removable portion of the can end be a large panel, as is shown in the drawing, in that the invention may be applied equally as well to tear strips and other smaller removable portions.

In accordance with this invention, the pivot member 13 includes a tubular shaft 14 which is provided at one end with an end wall 15 having a solder passage 16 therethrough. At the other end of the tubular shaft 14 there is an outwardly directed retaining flange 17.

In accordance with the preferred embodiment of the invention, the removable portion 11 is provided with a recessed part 18 which defines a recess 19. Also, the pull handle 12 is provided with a bore 20 therethrough and a concentric recess 21 in the outer face thereof. When the pull handle 12 is secured to the removable portion 11, solder 22 is disposed between the recessed portion 18 and the end wall 15 to rigidly secure the pivot member 13 to the removable portion 11. At the same time, the retaining flange 17 is seated in the recess 21 in the pull handle 12 so as to retain the pull handle in place on the removable portion 11 while permitting the pivoting thereof.

In accordance with this invention, the pivot member 13 is provided with a solder pellet 23. When the pivot member 13 is so equipped, after the can end 7, the pull handle 12 and the pivot member 13 have been loosely assembled, it is merely necessary to insert a heated iron into the pivot member 13 to melt the solder pellet 23 so that the solder thereof may flow through the opening 16 and between the end wall 15 and the recessed portion 18, as is clearly shown in FIGURE 2. It will thus be apparent that the specific pivot member 13 is readily securable to the can end 7 utilizing a minimum of solder and requiring no prior accurate positioning of the solder on the can end.

It is preferred that the solder pellet 23 be assembled with the pivot member 13 prior to the use of the pivot member 13. However, it is feasible to assemble the pivot member 13 with the handle 12 and the can end 7 and then insert the solder pellet 23, after which the soldering operation takes place.

It is also pointed out at this time that the specific solder connection shown in FIGURE 2 has added strength in that by utilizing the solder pellet 23, there always assured the required amount of solder at 22 to provide for the necessary solder connection without an excess of solder. At the same time, since the solder is disposed both within the pivot member 13 and beneath the same, there is a mechanical connection of the solder extending through the opening 16.

Although only a preferred embodiment of the invention has been illustrated and described herein, it is to be understood that minor variations may be made in the pivot member construction within the scope and spirit of this invention, as defined by the appended claims.

What is claimed is:

1. A pivot-type fastening member adapted to be soldered to a base member, said fastening member comprising a tubular shaft portion, and an end wall at one end of said tubular shaft adapted to be soldered to a base member, said end wall having a solder passage therethrough to facilitate the soldering of said fastening member to a base member.

2. A pivot-type fastening member adapted to be soldered to a base member, said fastening member comprising a tubular shaft portion, an end wall at one end of said tubular shaft having a solder passage therethrough, and a solder pellet within said fastening member adapted to flow through said solder passage and beneath said end wall when said solder pellet is heated.

3. A pivot-type fastening member adapted to be soldered to a base member, said fastening member comprising a tubular shaft portion, an end wall at one end of said tubular shaft adapted to be soldered to a base member, said end wall having a solder passage therethrough to facilitate the soldering of said fastening member to a base member, and an outwardly directed article retaining flange on said tubular shaft remote from said end wall.

4. A pivot-type fastening member adapted to be soldered to a base member, said fastening member comprising a tubular shaft portion, an end wall at one end of said tubular shaft adapted to be soldered to a base member, said end wall having a solder passage therethrough, a solder pellet within said fastening member adapted to flow through said solder passage and beneath said end wall when said solder pellet is heated, and an outwardly directed article retaining flange on said tubular shaft remote from said end wall.

5. An assembly comprising a base member, an article, and a pivot member pivotally securing said article to said base member, said pivot member including a tubular shaft having an end wall at one end and an outwardly directed retaining flange at the opposite end thereof, said end wall having a solder passage therethrough, and solder securing said end wall to said base member, said solder being partially disposed within said pivot member and passing through said solder passage.

6. An assembly comprising a base member, an article, and a pivot member pivotally securing said article to said base member, said pivot member including a tubular shaft having an end wall at one end and an outwardly directed retaining flange at the opposite end thereof, said end wall having a solder passage therethrough, and solder securing said end wall to said base member, said solder being partially disposed within said pivot member and passing through said solder passage, said article having a recessed outer face and said retaining flange being seated in said recess.

7. An assembly comprising a base member, an article, and a pivot member pivotally securing said article to said base member, said pivot member including a tubular shaft having an end wall at one end and an outwardly directed retaining flange at the opposite end thereof, said end wall having a solder passage therethrough, and solder securing said end wall to said base member, said solder being partially disposed within said pivot member and passing through said solder passage, said base member having a recess therein and said end wall being seated in said recess.

8. A can end construction comprising a can end having a removable portion defined by a weakening line, a pull handle, and a pivot member pivotally securing said pull handle to said removable portion of the can end, said pivot member including a tubular shaft having an end wall at one end and an outwardly directed retaining flange at the opposite end thereof, said end wall having a solder passage therethrough, and solder securing said end wall to said removable portion, said solder being partially disposed within said pivot member and passing through said solder passage.

9. A method of pivotally securing an article to a base member utilizing a hollow pivot member having an end wall with an opening therethrough comprising the steps of providing the pivot member with a solder pellet, and heating the solder pellet after the article, base member and pivot member have been assembled to cause the flow of solder through the end wall opening and between the end wall and the base member.

10. The method of claim 9 wherein the solder pellet is positioned within the pivot member prior to the assembling of the base member, the article and the pivot member.

11. The method of claim 9 wherein the solder pellet is positioned within the pivot member subsequent to the assembling of the base member, the article and the pivot member.

References Cited by the Examiner

UNITED STATES PATENTS 2,817,144  12/57  Zeller _____ 29—501

FOREIGN PATENTS 409,475  5/34  Great Britain.

THERON E. CONDON, *Primary Examiner.*

EARLE A. DRUMMOND, *Examiner.*